(12) United States Patent
Liu et al.

(10) Patent No.: US 9,359,529 B2
(45) Date of Patent: Jun. 7, 2016

(54) ELECTRON BEAM CURED SILICONE MATERIALS

(75) Inventors: Junkang J. Liu, Woodbury, MN (US); Clayton A. George, Afton, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 122 days.

(21) Appl. No.: 13/125,891

(22) PCT Filed: Oct. 29, 2009

(86) PCT No.: PCT/US2009/062563
§ 371 (c)(1),
(2), (4) Date: Apr. 25, 2011

(87) PCT Pub. No.: WO2010/056541
PCT Pub. Date: May 20, 2010

(65) Prior Publication Data
US 2011/0206923 A1    Aug. 25, 2011

Related U.S. Application Data

(60) Provisional application No. 61/109,213, filed on Oct. 29, 2008.

(51) Int. Cl.
| | |
|---|---|
| C08G 77/04 | (2006.01) |
| C09J 7/02 | (2006.01) |
| C08J 3/28 | (2006.01) |
| C08J 9/32 | (2006.01) |
| C09J 183/04 | (2006.01) |
| C09J 183/08 | (2006.01) |

(52) U.S. Cl.
CPC *C09J 7/0207* (2013.01); *C08J 3/28* (2013.01); *C08J 9/32* (2013.01); *C09J 183/04* (2013.01); *C08J 2201/024* (2013.01); *C08J 2207/02* (2013.01); *C08J 2383/04* (2013.01); *C09J 183/08* (2013.01); *Y10T 428/249983* (2015.04); *Y10T 428/2809* (2015.01); *Y10T 428/2852* (2015.01)

(58) Field of Classification Search
CPC ........... C09J 184/04; C09J 184/08; C08J 3/28
See application file for complete search history.

(56) References Cited

U.S. PATENT DOCUMENTS

| | | | |
|---|---|---|---|
| 991,574 A | 5/1911 | Wesson | |
| 2,763,609 A | 9/1956 | Lewis | |
| 2,857,356 A | 10/1958 | Goodwin | |
| 2,956,904 A | 10/1960 | Hendricks | |
| 3,146,799 A | 9/1964 | Frank | |
| 3,179,546 A | 4/1965 | Fischer | |
| 4,201,808 A | 5/1980 | Cully | |
| 4,348,454 A | 9/1982 | Eckberg | |
| 4,547,431 A | 10/1985 | Eckberg | |
| 4,655,768 A | 4/1987 | Marecki | |
| 4,684,670 A | 8/1987 | Eckberg | |
| 4,746,699 A | 5/1988 | Modic | |
| 4,767,494 A | 8/1988 | Kobayashi | |
| 4,777,063 A | 10/1988 | Dubrow et al. | |
| 4,808,640 A | 2/1989 | Morita | |
| 4,810,728 A | 3/1989 | Gross | |
| 4,859,712 A | 8/1989 | Cox | |
| 4,865,920 A * | 9/1989 | Sweet | 428/447 |
| 4,950,546 A | 8/1990 | Dubrow et al. | |
| 4,991,574 A | 2/1991 | Pocknell | |
| 5,147,916 A | 9/1992 | Sweet | |
| 5,162,410 A | 11/1992 | Sweet | |
| 5,206,092 A * | 4/1993 | Araki et al. | 428/447 |
| 5,248,739 A * | 9/1993 | Schmidt et al. | 525/477 |
| 5,302,671 A | 4/1994 | Cifuentes | |
| 5,356,940 A | 10/1994 | Giesen | |
| 5,436,274 A | 7/1995 | Sumpter | |
| 5,436,303 A * | 7/1995 | Lin | 525/477 |
| 5,543,231 A | 8/1996 | Kidon | |
| 5,580,915 A | 12/1996 | Lin | |
| 5,602,214 A * | 2/1997 | Lin et al. | 525/478 |
| 5,611,884 A | 3/1997 | Bearinger | |
| 5,661,192 A | 8/1997 | Giraud | |
| 5,670,555 A | 9/1997 | Loiselle | |
| 5,683,527 A | 11/1997 | Angell | |
| 5,747,172 A | 5/1998 | Crivello | |
| 5,753,720 A | 5/1998 | Nakanishi et al. | |
| 5,804,610 A | 9/1998 | Hamer | |
| 5,905,123 A | 5/1999 | Cifuentes | |

(Continued)

FOREIGN PATENT DOCUMENTS

| | | |
|---|---|---|
| CN | 1183113 A | 5/1998 |
| CN | 1884378 | 12/2006 |
| EP | 452034 | 10/1991 |
| EP | 0537784 B1 | 3/1995 |
| EP | 0779653 | 6/1997 |
| EP | 0781813 | 7/1997 |
| EP | 0830428 B1 | 9/2002 |
| EP | 2062952 | 5/2009 |
| EP | 2062952 A1 | 5/2009 |
| EP | 1696973 B1 | 2/2010 |

(Continued)

OTHER PUBLICATIONS

English language translation JP 610264079, Nov. 1986 (supplied by applicants).*
ASTM E 1818-961[e1,] Standard Practice for Dosimetry in an Electron Beam Facility for Radiation Processing at Energies Between 80 and 300 keV[1], 1996, pp. 903-910.
Frounchi,"Comparison Between Electron-beam and Chemical Crosslinking of Silicone Rubber", Nuclear Instruments and Methods in Physics Research B, 2006, vol. 243, pp. 354-358.

(Continued)

*Primary Examiner* — Margaret Moore
(74) *Attorney, Agent, or Firm* — 3M Innovative Properties Company; Lynn R. Hunsberger (57) ABSTRACT

Methods of preparing silicone materials using electron beam curing are described. The materials are hot melt processed and cured in the absence of an effective amount of catalysts and initiators. Both functional and nonfunctionalized silicone materials may be used. Exemplary cured materials include silicone pressure sensitive adhesives, silicone foams, and non-tacky silicon films.

21 Claims, 1 Drawing Sheet

(56) References Cited

U.S. PATENT DOCUMENTS

| | | | |
|---|---|---|---|
| 5,907,018 A | 5/1999 | Mazurek | |
| 5,961,770 A | 10/1999 | Cifuentes | |
| 6,051,747 A | 4/2000 | Lindqvist | |
| 6,207,875 B1 | 3/2001 | Lindqvist | |
| 6,337,086 B1 | 1/2002 | Kanios et al. | |
| 6,359,026 B1 | 3/2002 | Marquardt | |
| 6,406,793 B1 | 6/2002 | Aoki | |
| 6,407,195 B2 * | 6/2002 | Sherman et al. | 528/28 |
| 6,472,581 B1 | 10/2002 | Muramatsu | |
| 6,521,309 B1 | 2/2003 | Chen | |
| 6,545,086 B1 | 4/2003 | Kosal | |
| 6,639,638 B1 | 10/2003 | Kodnani | |
| 6,639,639 B2 | 10/2003 | Baek | |
| 6,664,359 B1 | 12/2003 | Kangas | |
| 6,730,397 B2 | 5/2004 | Melancon et al. | |
| 6,818,673 B2 | 11/2004 | Ferguson | |
| 6,846,508 B1 | 1/2005 | Colas | |
| 6,890,601 B2 | 5/2005 | Griswold | |
| 7,005,475 B2 | 2/2006 | Griswold | |
| 7,012,110 B2 | 3/2006 | Sherman et al. | |
| 7,253,238 B2 | 8/2007 | Griswold et al. | |
| 7,371,464 B2 | 5/2008 | Sherman | |
| 7,393,879 B1 | 7/2008 | Kresta | |
| 7,407,709 B2 * | 8/2008 | Zhou et al. | 428/447 |
| 7,695,818 B2 | 4/2010 | Sherman et al. | |
| 7,807,268 B2 | 10/2010 | Zhou et al. | |
| 8,084,097 B2 | 12/2011 | Fisher | |
| 8,173,525 B2 | 5/2012 | Graham, Jr. et al. | |
| 8,541,481 B2 | 9/2013 | Determan | |
| 2001/0037008 A1 | 11/2001 | Sherman | |
| 2002/0013442 A1 | 1/2002 | Sherman | |
| 2003/0113534 A1 * | 6/2003 | Poisson | 428/343 |
| 2003/0152768 A1 | 8/2003 | Kremer | |
| 2005/0113479 A1 | 5/2005 | Eckberg | |
| 2005/0136266 A1 | 6/2005 | Zhou | |
| 2005/0282024 A1 | 12/2005 | Sherman | |
| 2007/0088094 A1 * | 4/2007 | Tamaki et al. | 522/99 |
| 2007/0110941 A1 | 5/2007 | Utesch | |
| 2007/0202245 A1 | 8/2007 | Gantner | |
| 2007/0212314 A1 | 9/2007 | Murphy | |
| 2008/0057251 A1 * | 3/2008 | Griswold et al. | 428/40.1 |
| 2008/0058460 A1 | 3/2008 | Tonge | |
| 2009/0036598 A1 | 2/2009 | Sherman | |
| 2009/0117310 A1 | 5/2009 | Ellringmann | |
| 2009/0117314 A1 | 5/2009 | Haese et al. | |
| 2009/0143496 A1 * | 6/2009 | Ziche | 522/148 |
| 2010/0310852 A1 | 12/2010 | Weidinger | |
| 2011/0206924 A1 | 8/2011 | Liu | |
| 2012/0098885 A1 | 4/2012 | Harada | |
| 2013/0295372 A1 | 11/2013 | Liu et al. | |
| 2013/0295373 A1 | 11/2013 | Liu et al. | |
| 2014/0011021 A1 | 1/2014 | Liu | |

FOREIGN PATENT DOCUMENTS

| | | |
|---|---|---|
| EP | 1737504 B1 | 6/2010 |
| GB | 805388 | 12/1958 |
| GB | 818987 | 8/1959 |
| JP | 61-264079 A2 | 11/1986 |
| JP | S61-264079 | 11/1986 |
| JP | S61-276824 | 12/1986 |
| JP | 62-149308 | 7/1987 |
| JP | 63-249627 | 10/1988 |
| JP | 01-215832 | 8/1989 |
| JP | 02-163181 | 6/1990 |
| JP | 04-216891 | 8/1992 |
| JP | 5169595 | 7/1993 |
| JP | 05-214316 | 8/1993 |
| JP | 6074399 | 10/1994 |
| JP | 10(1998)505382 | 5/1998 |
| JP | 11140323 | 5/1999 |
| JP | 2004-224857 | 8/2004 |
| JP | 2004-224857 A2 | 8/2004 |
| JP | 2005-070245 | 3/2005 |
| JP | 2005-513195 | 5/2005 |
| JP | 2007-520265 | 7/2007 |
| JP | 2008-179743 | 8/2008 |
| JP | 2010-106079 | 5/2010 |
| JP | 4849477 | 1/2012 |
| JP | 5-329181 | 10/2013 |
| WO | WO 95-23694 | 9/1995 |
| WO | WO 96/07522 | 3/1996 |
| WO | WO 96-35458 | 11/1996 |
| WO | WO 98-23305 | 6/1998 |
| WO | WO 99-18166 | 4/1999 |
| WO | WO 02-097003 | 12/2002 |
| WO | WO 03-010257 | 2/2003 |
| WO | WO 2005-005705 | 1/2005 |
| WO | WO 2005/006389 | 7/2005 |
| WO | WO 2005/063890 | 7/2005 |
| WO | WO 2005/065736 A2 | 7/2005 |
| WO | WO 2005/110737 | 11/2005 |
| WO | WO 2006/009596 | 1/2006 |
| WO | WO 2007/075802 A2 | 7/2007 |
| WO | WO 2008-027498 | 3/2008 |
| WO | WO 2008-057155 | 5/2008 |
| WO | WO 2009-076389 | 6/2009 |
| WO | WO 2010-056544 | 5/2010 |
| WO | WO 2010-056546 | 5/2010 |
| WO | WO 2011-136977 | 11/2011 |

OTHER PUBLICATIONS

Labouriau, "Mossbauer, NMR and ATR-FTIR spectroscopic investigation of degradation in RTV siloxane foams," Polym. Degradation & Stability, 2007, vol. 92, pp. 414-424.

Lin, "Recent advances in silicone pressure-sensitive adhesives," J. Adhesion Sci. Technol., Feb. 2007,vol. 21, No. 7, pp. 605-623.

Park, "Mechanical Properties and Antibacterial Activity of Peroxide-Cured Silicone Rubber Foams," J. Appl. Polym. Sci, May 2008, vol. 110, pp. 1723-1729.

International Search Report for PCT/US2009/062563, Feb. 12, 2010, 3 pages.

International Search Report for PCT/US2009/062576, Feb. 9, 2010, 4 pages.

International Search Report for PCT/US2009/062608, Feb. 8, 2010, 3 pages.

International Search Report for PCT/US2011/033021, mailed Jul. 11, 2011, 3 page.

International Search Report for PCT/US2009/062603, Feb. 9, 2010, 3 pages.

Squire et al., "Radiation Cross-Linking of Polydimethylsiloxane. Cross-linking and Fracture by Solubility Analysis," Macromolecules, 1972;5(4):401-404.

Rogero et al., "Silicone Crosslinked by Ionizing Radiation as Potential Polymeric Matrix for Drug Delivery," Nuclear Instruments and Methods in Physics Research B, 2005;236:521-525.

Product Data Sheet for Elastosil LR 3003/20 A and B—Version 4.00/30-08-04; 1 pg.

Falcão et al. 1993. Macromolecules. 26:5350-5364. "Structure of Randomly Cross-Linked Poly(dimethylsiloxane) Networks Produced by Electron Irradiation".

ASTM D 3330M-90 Standard Test Methods for Peel Adhesion of Pressure Sensitive Tape at 180 Angle [Metric]1, p. 464-467.

Amouroux et al., "Role of Interfacial Resistance to Shear Stress on Adhesive Peel Strength," Langmuir, 2001;17:6510-6517.

Thomas, Xavier "Silicone Adhesives in Healthcare Applications," Dow Corning Healthcare Industry, © 2003; Form No. 52-1057-01; 6 pgs.

"Glossary of Terms Used in the Pressure Sensitive Tape Industry", Pressure Sensitive Tape Council, Glenview, Illinois, Aug. 1985. 4 pages.

"Glossary of Terms Used in the Pressure Sensitive Tape Industry," Pressure Sensitive Tape Council, Glenview, Illinois, Aug. 1985, 4 pages.

Satas, Ed., Handbook of Pressure Sensitive Adhesive Technology, Van Nostrand Reinhold, New York, New York, 1989. Cover page, publisher's page, pp. 172, 728, 729.

* cited by examiner

ELECTRON BEAM CURED SILICONE MATERIALS

CROSS REFERENCE TO RELATED APPLICATIONS

This application is a national stage filing under 35 U.S.C. 371 of PCT/US2009/062563, filed Oct. 29, 2009, which claims priority to U.S. Provisional Application No. 61/109,213, filed Oct. 29, 2008, the disclosure of which is incorporated by reference in its/their entirety herein.

FIELD

The present disclosure relates to silicone materials, including silicone pressure sensitive adhesives, silicone foams, and non-tacky silicone films. More specifically, the present disclosure describes silicone materials cured by exposure to electron beam irradiation.

BACKGROUND

Pressure sensitive adhesives (PSAs) are an important class of materials. Generally, PSAs adhere to a substrate with light pressure (e.g., finger pressure) and typically do not require any post-curing (e.g., heat or radiation) to achieve their maximum bond strength. A wide variety of PSA chemistries are available including, e.g., acrylic, rubber, and silicone based systems. Silicone PSAs offer one or more of the following useful characteristics: adhesion to low surface energy (LSE) surfaces, quick adhesion with short dwell times, wide use temperature (i.e., performance at high and low temperature extremes), weathering resistance (including resistance to ultraviolet (UV) radiation, oxidation, and humidity), reduced sensitivity to stress variations (e.g., mode, frequency and angle of applied stresses), and resistance to chemicals (e.g., solvents and plasticizers) and biological substances (e.g., mold and fungi).

Generally, silicone pressure sensitive adhesives have been formed by a condensation reaction between a polymer or gum and a tackifying resin. The polymer or gum is typically a high molecular weight silanol-terminated poly(diorganosiloxane) material e.g., silanol-terminated poly(dimethylsiloxane) ("PDMS") or poly(dimethylmethylphenylsiloxane). The tackifying resin is typically a three-dimensional silicate structure end-capped with trimethylsiloxy groups. In addition to the terminal silanol groups of the polymer or gum, the tackifying resin may also include residual silanol functionality.

Such systems rely on high molecular weight starting materials; thus, they must be diluted in solvents to achieve viscosities suitable for coating at room temperature. Typical coatable solutions contain less than 60% solids by weight in a solvent (e.g., an aromatic solvent such as toluene or xylene). Additional solvent may be added prior to coating such that volatile organic compound (VOC) contents of greater than 50% are common when using traditional silicone PSAs.

A number of approaches have been investigated for the low VOC delivery of silicone PSAs. For example, water-based emulsion systems and liquid solventless systems based on low-viscosity, highly-functional silicone polymers have been explored, e.g., polymers including silicon-bonded hydrogen, silicon-bonded vinyl, silicon-bonded epoxy, and silicon-bonded acrylate. Hot-melt, moisture-curable, silicone PSAs that rely on silicon-bonded hydrolysable functional groups (e.g., alkoxy, acetoxy, or oxime groups) have also been attempted.

Despite these advances, there is still a need for more robust methods for the low VOC delivery of silicone PSAs. There is also a need for low VOC delivery processes that allow for a greater diversity of silicone chemistries to be used, thus enabling a broader range of end-use performance properties.

While some silicone PSA formulations provide acceptable performance after solvent removal, some systems benefit from additional crosslinking. Conventional silicone PSAs are cured by thermal processes using specific types of catalysts. For example, platinum catalysts have been used with addition cure systems, peroxides (e.g., benzoyl peroxide) have been used with hydrogen-abstraction cure systems, and tin catalysts have been used with moisture/condensation cure systems.

Generally, some of these approaches require reactive functional groups attached to the siloxane backbone. For example, addition-cure, platinum-catalyzed systems generally rely on a hydrosilation reaction between silicon-bonded vinyl functional groups and silicon-bonded hydrogens. In general, it may be desirable to have a silicone adhesive system that can be cured without the use of catalysts, particularly when hot-melt coating or in other circumstances where premature curing should be avoided.

SUMMARY

Briefly, in one aspect, the present disclosure provides a method of making a crosslinked silicone-based material. The method comprises hot melt processing a composition comprising a silicone material and subjecting the composition to electron beam irradiation forming the crosslinked silicone-based material. The composition is free of an effective amount of catalysts and initiators. In some embodiments, hot melt processing comprises extruding.

In some embodiments, the silicone material is a nonfunctionalized silicone material. In some embodiments, the silicone material comprises a siloxane backbone and at least one functional group. In some embodiments, all functional groups are hydroxy groups.

In some embodiments, the crosslinked silicone-based material is a silicone pressure sensitive adhesive. In some embodiments, the crosslinked silicone-based material is a silicone foam. In some embodiments, the crosslinked silicone-based material is a non-tacky silicone foam.

In some embodiments, the silicone material is a polysiloxane, e.g., a poly(dialkyl siloxane) or a poly(dimethyl siloxane). In some embodiments, the polysiloxane is an aromatic siloxane.

In some embodiments, the composition further comprises a tackifier, e.g., an MQ resin tackifier.

In another aspect the present disclosure provides a crosslinked-silicone-based material made according to the methods of the present disclosure. In some embodiments, the silicone pressure sensitive adhesive comprises a crosslinked, silicone elastomer, wherein the adhesive is substantially free of catalysts and initiators. In some embodiments, the adhesive further comprises a tackifier, e.g., an MQ resin tackifier. In some embodiments, the material is a foam. In some embodiments, the material is a non-tacky film.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Generally, the crosslinked siloxane networks of the present disclosure can be formed from either functional or non-functional silicone materials. Generally, the silicone materials may be oils, fluids, gums, elastomers, or resins, e.g., friable solid resins. In some embodiments, the nonfunctionalized silicone materials can be a linear material described by the following formula illustrating a siloxane backbone with aliphatic and/or aromatic substituents:

wherein R1, R2, R3, and R4 are independently selected from the group consisting of an alkyl group and an aryl group, each R5 is an alkyl group and n and m are integers, and at least one of m or n is not zero. In some embodiments, one or more of the alkyl or aryl groups may contain a halogen substituent, e.g., fluorine. For example, in some embodiments, one or more of the alkyl groups may be —CH$_2$CH$_2$C$_4$F$_9$.

In some embodiments, R5 is a methyl group, i.e., the nonfunctionalized silicone material is terminated by trimethylsiloxy groups. In some embodiments, R1 and R2 are alkyl groups and n is zero, i.e., the material is a poly(dialkylsiloxane). In some embodiments, the alkyl group is a methyl group, i.e., poly(dimethylsiloxane) ("PDMS"). In some embodiments, R1 is an alkyl group, R2 is an aryl group, and n is zero, i.e., the material is a poly(alkylarylsiloxane). In some embodiments, R1 is methyl group and R2 is a phenyl group, i.e., the material is poly(methylphenylsiloxane). In some embodiments, R1 and R2 are alkyl groups and R3 and R4 are aryl groups, i.e., the material is a poly(dialkyldiarylsiloxane). In some embodiments, R1 and R2 are methyl groups, and R3 and R4 are phenyl groups, i.e., the material is poly(dimethyldiphenylsiloxane).

In some embodiments, the nonfunctionalized silicone materials may be branched. For example, one or more of the R1, R2, R3, and/or R4 groups may be a linear or branched siloxane with alkyl or aryl (including halogenated alkyl or aryl) substituents and terminal R5 groups.

As used herein, "nonfunctional groups" are either alkyl or aryl groups consisting of carbon, hydrogen, and in some embodiments, halogen (e.g., fluorine) atoms. As used herein, a "nonfunctionalized silicone material" is one in which the R1, R2, R3, R4, and R5 groups are nonfunctional groups.

Generally, functional silicone systems include specific reactive groups attached to the siloxane backbone of the starting material (for example, hydrogen, hydroxyl, vinyl, allyl, or acrylic groups). As used herein, a "functionalized silicone material" is one in which at least one of the R-groups of Formula 2 is a functional group.

In some embodiments, a functional silicone material is one is which at least 2 of the R-groups are functional groups. Generally, the R-groups of Formula 2 may be independently selected. In some embodiments, the only functional groups present are hydroxyl groups, e.g., silanol terminated polysiloxanes such as silanol terminated poly dimethyl siloxane.

In addition to functional R-groups, the R-groups may be nonfunctional groups, e.g., alkyl or aryl groups, including halogenated (e.g., fluorinated) alky and aryl groups. In some embodiments, the functionalized silicone materials may be branched. For example, one or more of the R groups may be a linear or branched siloxane with functional and/or non-functional substituents.

Generally, lower molecular weight, lower viscosity materials are referred to as fluids or oils, while higher molecular weight, higher viscosity materials are referred to as gums; however, there is no sharp distinction between these terms. Typically, the terms "fluid" and "oil" refer to materials having a dynamic viscosity at 25° C. of no greater than 1,000,000 mPa·sec (e.g., less than 600,000 mPa·sec), while materials having a dynamic viscosity at 25° C. of greater than 1,000,000 mPa·sec (e.g., at least 10,000,000 mPa·sec) are referred to as "gums".

The pressure sensitive adhesives of the present disclosure may be prepared by combining silicone materials (e.g., silicone gums or elastomers) with an appropriate tackifying resin, hot melt coating the resulting combination, and curing using electron beam (E-beam) irradiation. Generally, any known additives useful in the formulation of pressure sensitive adhesives (e.g., dyes, pigments, fillers, flame retardants, rheology modifiers, flow agents, surfactants, microspheres (e.g., expandable microspheres), and the like may be also be included.

Generally, any known tackifying resin may be used, e.g., in some embodiments, silicate tackifying resins may be used. In some exemplary adhesive compositions, a plurality of silicate tackifying resins can be used to achieve desired performance.

Suitable silicate tackifying resins include those resins composed of the following structural units M (i.e., monovalent R'$_3$SiO$_{1/2}$ units), D (i.e., divalent R'$_2$SiO$_{2/2}$ units), T (i.e., trivalent R'SiO$_{3/2}$ units), and Q (i.e., quaternary SiO$_{4/2}$ units), and combinations thereof. Typical exemplary silicate resins include MQ silicate tackifying resins, MQD silicate tackifying resins, and MQT silicate tackifying resins. These silicate tackifying resins usually have a number average molecular weight in the range of 100 to 50,000-gm/mole, e.g., 500 to 15,000 gm/mole and generally R' groups are methyl groups.

MQ silicate tackifying resins are copolymeric resins where each M unit is bonded to a Q unit, and each Q unit is bonded to at least one other Q unit. Some of the Q units are bonded to only other Q units. However, some Q units are bonded to hydroxyl radicals resulting in HOSiO$_{3/2}$ units (i.e., "T$^{OH}$" units), thereby accounting for some silicon-bonded hydroxyl content of the silicate tackifying resin.

The level of silicon bonded hydroxyl groups (i.e., silanol) on the MQ resin may be reduced to no greater than 1.5 weight percent, no greater than 1.2 weight percent, no greater than 1.0 weight percent, or no greater than 0.8 weight percent based on the weight of the silicate tackifying resin. This may be accomplished, for example, by reacting hexamethyldisilazane with the silicate tackifying resin. Such a reaction may be catalyzed, for example, with trifluoroacetic acid. Alternatively, trimethylchlorosilane or trimethylsilylacetamide may be reacted with the silicate tackifying resin, a catalyst not being necessary in this case.

MQD silicone tackifying resins are terpolymers having M, Q and D units. In some embodiments, some of the methyl R' groups of the D units can be replaced with vinyl (CH2=CH—) groups ("D$^{Vi}$" units). MQT silicate tackifying resins are terpolymers having M, Q and T units.

Suitable silicate tackifying resins are commercially available from sources such as Dow Corning (e.g., DC2-7066), Momentive Performance Materials (e.g., SR545 and SR1000).

The silicone material, the tackifying resin, and any optional additives may be combined by any of a wide variety of known means prior to being hot melt coated and cured. For example, in some embodiments, the various components may be pre-blended using common equipment such as mixers, blenders, mills, extruders, and the like. In some embodiments, the hot melt coating process is extrusion. In such embodiments, the various components may be added together, in various combinations or individually, through one or more separate ports of an extruder, blended (e.g., melt mixed) within the extruder, and extruded to form the hot melt coated composition. Regardless of how it is formed, the hot melt coated composition is cured through exposure to E-beam irradiation.

In some embodiments, the methods and materials of the present disclosure may be used to foam silicone foams, including silicone adhesive foams. Silicone foams provide unique properties, including: resilience, wide service temperature stability (e.g., −50° C. to about 200° C.), inertness, and inherent flame retardancy. Generally, silicone foams have been made in processes where cell growth or expansion (i.e., the foaming process) and cell stabilization (i.e., the crosslinking process) are happened simultaneously. Most common cell expansion chemistries for silicone foams rely on chemical blowing agents, e.g. azo containing compounds or condensed gas by-product from crosslinking reactions.

In contrast, through the use of e-beam curing process of the present disclosure, the cell expansion or foaming process and cell stabilization or crosslinking process can be independently optimized. In some embodiments, this can lead to improved control over cell structures with uniform distribution of foam cell sizes. The E-beam cured silicone foams can be made with microspheres, including both rigid non-polymeric hollow microspheres, e.g. glass bubbles and polymeric microspheres, including thermally expandable polymeric microspheres.

Glass bubble are known in the art and can be obtained commercially and/or be made by the techniques known in the art. Useful glass bubbles include glass bubbles available from 3M company under trade designation "3M SCOTCHILITE GLASS BUBBLES" (e.g. grades K1, K15, S15, S22, K20, K25, S32, K37, S38HS, K46, A16/500, A20/1000, and D32/4500); glass bubbles available from Potters Industries under the trade designation "Q-CELL HOLLOW SPHERES" (e.g. grades 30, 6014, 6019, 6028, 6036, 6042, 6048, 5019, 5023, and 5028); and glass bubbles available from Silbrico Corp. under the trade designation "SIL-CELL" (e.g. grads SIL 35/34, SIL-32, SIL-42, and SIL-43). Those glass bubbles generally have an average density in a range of 0.1 g/cm$^3$ to 0.5 g/cm$^3$ and an average bubble size in a range of 5 to 250 micrometers.

Polymeric microspheres are hollow spheres with polymeric shells. In some embodiments, expandable polymeric microspheres could be used. Such expandable microspheres include a polymer shell and a core material in the form of a gas, liquid, or a combination (e.g., propane, butane, pentane, isobutene, neopentane, and combinations thereof). Upon heating, the shell softens and core expands, causing the shell to expand without breaking. Upon cooling, the shell re-hardens, and the expandable microsphere remains expanded. Exemplary thermally expandable polymeric microspheres have an acrylonitrile-containing shell and suitable core materials including Useful expandable microspheres include microspheres available from Henkel under the designation "MICROPEARL" (e.g. grades F30, F80, and F100) and microspheres market by Akzo-nobel under the trade name EXPANCEL (e.g., "Expancel 551", "Expancel 461", and "Expancel 091").

The silicone material, the microsphere, and any optional additives may be combined by any of a wide variety of known means prior to being hot melt coated and cured. Generally, any known additives useful for the foam (e.g., tackifiers, plasticizers, dyes, pigments, fillers, flame retardants, rheology modifiers, and surfactants) may be also included. For example, in some embodiments, the various components may be pre-blended using common equipment such as mixers, blenders, mills, extruders, and the like. In some embodiments, the hot melt coating process is extrusion. In such embodiments, the various components may be added together, in various combinations or individually, through one or more separate ports of an extruder, blended (e.g., melt mixed) within the extruder, and extruded to form the hot melt coated composition. Regardless of how it is formed, the hot melt coated composition is cured through exposure to E-beam irradiation.

A variety of procedures for E-beam curing are well-known. The cure depends on the specific equipment used to deliver the electron beam, and those skilled in the art can define a dose calibration model for the equipment used.

Commercially available electron beam generating equipment are readily available. For the examples described herein, the radiation processing was performed on a Model CB-300 electron beam generating apparatus (available from Energy Sciences, Inc. (Wilmington, Mass.). Generally, a support film (e.g., polyester terephthalate support film) runs through an inert chamber. In some embodiments, a sample of uncured material with a liner (e.g., a fluorosilicone release liner) on both sides ("closed face") may be attached to the support film and conveyed at a fixed speed of about 6.1 meters/min (20 feet/min). In some embodiments, a sample of the uncured material may be applied to one liner, with no liner on the opposite surface ("open face").

The uncured material may be exposed to E-beam irradiation from one side through the release liner. For making a single layer laminating adhesive type tape, a single pass through the electron beam may be sufficient. Thicker samples, such as a foam tape, may exhibit a cure gradient through the cross section of the tape so that it may be desirable to expose the uncured material to electron beam radiation from both sides.

In contrast to previous methods for curing silicone materials, the methods of the present disclosure do not require the use of catalysts or initiators. Thus, the methods of the present disclosure can be used to cure compositions that are "substantially free" of any catalysts or initiators. As used herein, a composition is "substantially free of catalysts and initiators" if the composition does not include an "effective amount" of a catalyst or initiator. As is well understood, an "effective amount" of a catalyst or initiator depends on a variety of factors including the type of catalyst or initiator, the composition of the curable material, and the curing method (e.g., thermal cure, UV-cure, and the like). In some embodiments, a particular catalyst or initiator is not present at an "effective amount" if the amount of catalyst or initiator does not reduce the cure time of the composition by at least 10% relative to the cure time for same composition at the same curing conditions, absent that catalyst or initiator.

EXAMPLES

The following examples illustrate the present inventors surprising discovery that a wide variety of silicone chemistries can be cured with electron beam (E-Beam) irradiation to obtain pressure sensitive adhesives. The performance of these E-beam cured adhesives is comparable to the same adhesives cured using traditional methods, even though none of the catalysts or initiators required for traditional curing were used.

For purposes of comparison, three samples were prepared with each of the silicone chemistries. A reference example in which the silicone was uncured, a comparative example in which the silicone was cured by the appropriate traditional method with the use of a catalyst, and an example of the present disclosure in which the silicone was cured with E-beam irradiation in the absence of catalysts and initiators.

Samples were tested for Peel Adhesion and Static Shear according to the following tests.

Peel Adhesion Test.

Peel adhesion was measured using an INSTRON Tensile Tester. The adhesive sample was slit to a width of 1.27 cm and length of 11.4 cm and laminated to 0.127 mm thick and 1.6 cm wide aluminum foil backing using one of the major surfaces of the adhesive. The resulting tape was then applied to a clean panel using four total passes of a 2 kg (4.5 lb) hard rubber roller. Before testing, the samples were aged at room temperature (22° C.) and 50% relative humidity before testing for either 20 minutes or 3 days. The panel was then mounted in an INSTRON Tensile Tester and the tape was pulled off at a 90 degree angle at a speed of 30.5 cm per minute. Results were measured in pounds per 0.5 inch, and converted to N/cm (i.e., 3.5 N/cm=1 lbf/0.5 inch).

Static Shear Test.

Shear Test. A sample of tape measuring 2.54 cm by 1.27 cm was laminated to a panel measuring 2.54 cm by 5.08 cm such that the tape edges were coextensive with edges of the panels. The panel overlapped 1.27 cm to cover the tape and the free ends of the panels extended in opposite directions. One end of a panel was hung on a rack in an oven set at 70° C. with a 500 gram weight hanging from the bottom of the end of the other panel so that the tape sample was under shear stress. The time for the bottom panel to release from the hanging panel was monitored for up to 10,000 minutes. Time to failure in minutes was recorded. For samples that survived for 10,000 minutes, a value of "10,000+" was recorded.

The Peel Test and Shear Test were conducted using both polypropylene panels and painted panels. The polypropylene panels were obtained from Standard Plaque Inc. (Melvindale, Mich.). The painted panels were identified as APR46336 from ACT (Hilldale, Mich.). As received, the painted panels had been prepared using a typical automotive paint system. The automotive paint system comprised a base electrocoat, a pigmented base coat, and a low surface energy carbamate crosslinked unpigmented acrylic-based clear coat was applied to a stainless steel panel. The resulting test surface had a surface energy of 32 dynes/cm as measured using "Accu-Dyne" solutions.

Foam Density Test Procedure.

The thickness, L, of a foam sheet was measured. The foam sheet was cut to form samples having a cross-sectional area of 2.54 cm by 2.54 cm (one inch by one inch) square with a knife cutter. The weight of the sample was measured in grams. The density was calculated by dividing the weight of the sample by its volume, wherein the volume is the product of the sample thickness and its cross sectional area The materials used in the preparation of the samples are summarized in Table 1.

TABLE 1

Materials summary.

| Material | Description | Source |
|---|---|---|
| DC-7658 | dispersion of PDMS gum and resin | Dow Corning |
| DC-2013 | dispersion of PDMS gum and resin | Dow Corning |
| DC-7355 | dispersion of PDMS gum and resin | Dow Corning |
| Q2-7735 | dispersion of PDMS gum and resin | Dow Corning |
| DC-7678 | reactive polysiloxane crosslinker | Dow Corning |
| Syl-Off-4000 | organo-platinum complex dispersed in polysiloxane | Dow Corning |
| SID-3352-O | 50% dichlorobenzoyl peroxide in PDMS | Gelest |
| PET-3SAC | primed polyester film | Mitsubishi Polyester Film |

Series 1: DC-7658

Reference Example RE-1

DC-7658 was coated as received using a knife coater with gap of 127 microns (5 mil) on the PET-3SAC film. The coated sample was immediately dried in an oven at 70° C. for 15 minutes.

Comparative Example CE-1

125 grams of DC-7658 were mixed in a glass jar with 0.5 grams of DC-7678 (crosslinker), and 0.5 grams Syl-Off-4000 (catalyst) and placed on a roller mixer for 4 hours at room temperature. The mixed solution was coated using a knife coater with gap of 127 microns on the PET-3SAC film. The coated sample was immediately dried in an oven at 70° C. for 15 minutes.

Examples 1A, 1B, and 1C

DC-7658 was coated as received using a knife coater with gap of 127 microns on the PET-3SAC film. The coated sample was immediately dried in an oven at 70° C. for 15 minutes. Dried samples were then passed through the E-beam chamber under <50 ppm oxygen level with 250 key and various dose levels: 1 Mrad (EX-1A), 5 Mrads (EX-1B), and 9 Mrads (EX-1C).

Series 2: DC-7355

Reference Example RE-2

DC-7355 was coated as obtained using a knife coater with gap of 127 microns on the PET-3SAC film. The coated sample was immediately dried in an oven at 70° C. for 15 minutes.

Comparative Example CE-2

100 grams DC-7355 and 4 grams of catalyst (SID-3352-O) were mixed in a glass jar which was later placed on a roller mixer for 4 hours at room temperature. The mixed solution was coated using a knife coater with gap of 127 microns on the PET-3SAC film. The coated sample was immediately dried in an oven at 70° C. for 10 minutes and then cured at 150° C. for another 15 minutes.

Examples 2A, 2B, and 2C

DC-7355 was coated as obtained using a knife coater with gap of 127 microns on the PET-3SAC film. The coated sample was immediately dried in an oven at 70° C. for 15 minutes. Dried samples were passed through the E-beam chamber under <50 ppm oxygen level with 250 key and various dose levels: 1 Mrad (EX-2A), 5 Mrads (EX-2B), and 9 Mrads (EX-2C).

Series 3: Q2-7735

Reference Example RE-3

Q2-7735 was coated as obtained using a knife coater with gap of 127 microns on the PET-3SAC film. The coated sample was immediately dried in an oven at 70° C. for 15 minutes.

Comparative Example CE-3

100 grams of Q2-7735 and 4 grams of SID-3352-O (catalyst) were mixed in a glass jar which was later placed on a roller mixer for 4 hours at room temperature. The mixed solution was coated using a knife coater with gap of 127 microns on the PET-3SAC film. The coated sample was immediately dried in an oven at 70° C. for 10 minutes and then cured at 150° C. for another 15 minutes.

Examples 3A, 3B, and 3C

Q2-7735 was coated as obtained using a knife coater with gap of 127 microns on the PET-3SAC film. Coated samples were immediately dried in an oven at 70° C. for 15 minutes. Dried samples were passed through the E-beam chamber under <50 ppm oxygen level with 250 key and various dose levels: 1 Mrad (EX-3A), 5 Mrads (EX-3B), and 9 Mrads (EX-3C).

Series 4: DC-2013

Reference Example RE-4

DC-2013 was coated as received using a knife coater with gap of 51 microns (2 mil) on the PET-3 SAC film.

Comparative Example CE-4

50 grams of DC-2013, 0.3 grams of DC-7678 (crosslinker), and 0.3 grams DC-4000 (catalyst) were mixed in a glass jar which was placed on a roller mixer for 4 hours at room temperature. The mixed solution was coated using a knife coater with gap of 51 microns on the PET-3SAC film. The coated sample was immediately cured in an oven at 70° C. for 15 minutes.

Examples 4A, 4B, and 4C

DC-2013 was coated as received using a knife coater with gap of 51 microns on the PET-3SAC film. Coated samples were passed through an E-beam chamber under <50 ppm oxygen level with 250 key and various dose levels: 1 Mrad (EX-4A), 5 Mrads (EX-4B), and 9 Mrads (EX-4C).

The Peel Adhesion and Static Shear performance of the exemplary E-beam adhesives in comparison to the reference and comparative examples are summarized in Table 2.

Figure 1:
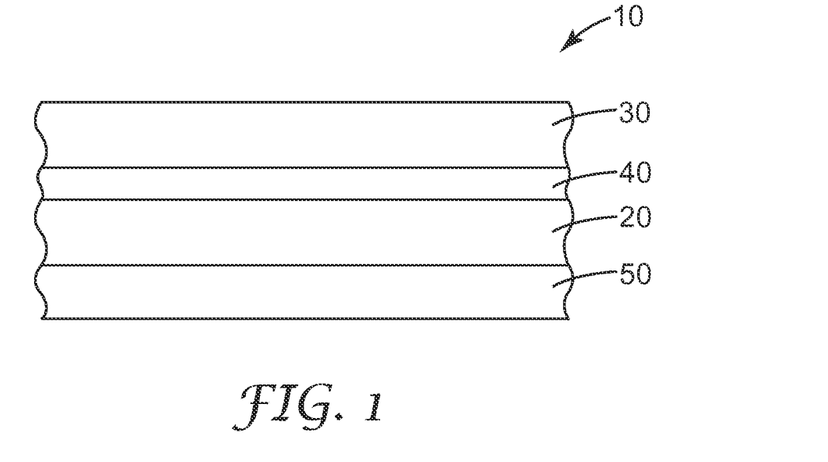
FIG. 1 illustrates an exemplary foam core tape according to some embodiments of the present disclosure.

In some embodiments, silicone PSAs of the present disclosure may be useful as the skin adhesive layers of a foam core tape. An exemplary foam core tape is shown in FIG. 1. Tape 10 includes foam core 20 and silicone PSA layer 30. Optional primer layer 40 is interposed between the PSA layer and the foam core. In some embodiments, second adhesive layer 50 may be adhered to the opposing surface of foam core 20. Again, in some embodiments, a primer layer may be used to aid in bonding the adhesive layer to the foam core or, as shown in FIG. 1, adhesive layer 50 may be bonded directly to the foam core 20.

Exemplary foam cores comprise one or more of acrylates, silicones, polyolefins, polyurethanes, and rubbers (e.g., block copolymers). These materials may be foamed by any known technique, e.g., inclusion of spheres (e.g., glass and polymeric microspheres, including expandable microspheres), frothing, using chemical blowing agents, and the like. In some embodiments, the foam core (e.g., a silicone foam core) may be E-beam cured separately, or in the same step as, the silicone PSA.

In addition to foam core tapes, some of the silicone PSAs of the present disclosure may be used as free films, with or without an internal support, e.g., a scrim. The silicone PSAs may be used as part of other single-coated and double-coated tape construction as well, i.e., bonded directly or indirectly to a support layer, e.g., a paper, polymeric film (e.g., fluorinated polymers such as polytetrafluoroethylene or urethane polymers), or a metal foil.

Foam core tapes with silicone skin adhesives were prepared using a variety of commercially available silicone pressure sensitive adhesive materials as identified by their trade names in Table 3.

TABLE 2

Properties of adhesive samples.

| | | | Painted panel | | | Polypropylene panel | | |
|---|---|---|---|---|---|---|---|---|
| System | Ex. | Cure | Peel (20 min) | Peel (72 hr) | 70° C. Shear | Peel (20 min) | Peel (72 hr) | 70° C. Shear |
| DC-7658 | RE-1 | none | (c/s) | (c/s) | 0 (c/s) | (c/s) | (c/s) | 0 (c/s) |
| | CE-1 | thermal | 4.1 | 4.5 | 10000 | 1.2 | 1.3 | 10000 |
| | 1A | 1 Mrad | 1.5 | 1.9 | 6 | 0.6 | 1.5 | 7 |
| | 1B | 5 Mrad | 3.7 | 4.8 | 10000 | 2.2 | 2.5 | 145 |
| | 1C | 9 Mrad | 3.7 | 3.9 | 10000 | 2.3 | 2.8 | 267 |
| DC-7355 | RE-2 | none | (c/s) | (c/s) | 0 (c/s) | (c/s) | (c/s) | 0 (c/s) |
| | CE-2 | thermal | 3.0 | 3.6 | 10000 | 3.0 | 3.6 | 10000 |
| | 2A | 1 Mrad | 4.1 | 3.6 | 447 | 2.2 | 2.7 | 3362 |
| | 2B | 5 Mrad | 3.3 | 3.3 | 10000 | 1.7 | 2.0 | 10000 |
| | 2C | 9 Mrad | 4.3 | 3.5 | 10000 | 2.1 | 1.8 | 10000 |
| Q2-7735 | RE-3 | none | (c/s) | (c/s) | 0 (c/s) | (c/s) | (c/s) | 0 (c/s) |
| | CE-3 | thermal | 3.4 | 3.6 | 6656 | 3.4 | 3.6 | 2752 |
| | 3A | 1 Mrad | 4.4 | 4.2 | 3422 | 2.8 | 3.7 | 640 |
| | 3B | 5 Mrad | 4.3 | 4.1 | 10000 | 2.6 | 3.2 | 7668 |
| | 3C | 9 Mrad | 4.4 | 4.6 | 10000 | 2.5 | 2.9 | 10000 |
| DC-2013 | RE-4 | none | (c/s) | (c/s) | 0 (c/s) | (c/s) | (c/s) | 0 (c/s) |
| | CE-4 | thermal | 3.0 | 3.6 | 10000 | 2.4 | 3.1 | 10000 |
| | 4A | 1 Mrad | 0.6 | 0.8 | 0 | 0.5 | 0.5 | 0 |
| | 4B | 5 Mrad | 0.7 | 0.8 | 0 | 0.6 | 0.6 | 0 |
| | 4C | 9 Mrad | 1.2 | 1.3 | 0 | 1.1 | 1.1 | 0 |

TABLE 3

Silicone adhesive systems.

| Trade name | Description | Solvent | Solids |
|---|---|---|---|
| SILGRIP ® PSA518 | silanol functional phenyl based polysiloxane gum and resin | xylene | 56% |
| SILGRIP ® PSA529 | silanol functional polysiloxane gum and resin | toluene | 55% |
| SILGRIP ® PSA590 | silanol functional polysiloxane gum and resin | toluene | 60% |
| SILGRIP ® PSA595 | silanol functional polysiloxane gum and resin | xylene | 55% |
| SILGRIP ® PSA610 | silanol functional polysiloxane gum and resin | xylene | 60% |
| SILGRIP ® PSA6573A | silanol functional polysiloxane gum and resin | toluene | 60% |
| SILGRIP ® PSA6574 | silanol functional phenyl based polysiloxane gum and resin | toluene | 55% |
| SILGRIP ® PSA910 | silanol functional polysiloxane gum and resin | toluene | 60% |
| SILGRIP ® PSA915 | silanol functional polysiloxane gum and resin | toluene | 60% |
| SILGRIP ® PSA950 | silanol functional phenyl based polysiloxane gum and resin | toluene | 55% |
| SILGRIP ® SCA1000 | silanol functional phenyl based polysiloxane gum and resin | hexane | 40% |
| Dow Corning ® 2013 | vinyl and hydride functional dimethyl methyl hydrogen siloxane | — | 100% |
| Dow Corning ® Q2-7406 | vinyl and hydride functional Poly dimethylsiloxane gum and resin | xylene | 55-58% |
| Dow Corning ® Q2-7735 | non-functional Poly dimethylsiloxane gum and resin | xylene | 55-58% |
| Dow Corning ® DC-7658 | vinyl and hydride functional Poly dimethylsiloxane gum and resin | xylene | 55-58% |
| Dow Corning ® DC-280A | silanol functional Poly dimethylsiloxane gum and resin | xylene | 55-57% |
| Dow Corning ® DC-282 | silanol functional Poly dimethylsiloxane gum and resin | xylene | 55-57% |
| Dow Corning ® DC-7355 | non-functional Poly dimethylsiloxane gum and resin | xylene/ toluene | 55-58% |
| Dow Corning ® DC-7358 | non-functional Poly dimethylsiloxane gum and resin | xylene/ toluene | 55-58% |
| Dow Corning ® Q2-7566 | non-functional Poly dimethylsiloxane gum and resin | xylene/ toluene | 55-58% |

The silicone materials were knife-coated unto a primed polyester film and dried at 70° C. for 15 minutes to achieve 50 micron (2 mil) dry thickness. The resulting tapes were E-beam irradiated at an acceleration voltage of 300 key and a dose of 6 Mrads. The E-beam units were broadband curtain type electron beam processors (PCT Engineered Systems, LLC, Davenport, Iowa). Uncrosslinked samples and E-beam crosslinked samples were tested according to the Peel Test (Table 4a) and Shear Test (Table 4b).

TABLE 4a

Peel adhesion of uncrosslinked and E-beam crosslinked silicone adhesives.

| | Peel (N/cm) uncrosslinked | | | | Peel (N/cm) E-beam @ 6 Mrad | | | |
|---|---|---|---|---|---|---|---|---|
| | Painted panel | | PP Panel | | Painted panel | | PP Panel | |
| Sample | 20 min | 72 hour | 20 min | 72 hour | 20 min | 72 hour | 20 min | 72 hour |
| PSA518 | 7.1 | 7.7 | 4.8 | 4.3 | 4.3 | 4.0 | 3.0 | N/A |
| PSA529 | 6.5 | 7.0 | 3.7 | 4.2 | 5.3 | 5.5 | 3.3 | 3.2 |
| PSA590 | 5.9 | 6.4 | 3.6 | 4.9 | 5.1 | 4.6 | 4.0 | 3.8 |
| PSA595 | 4.5 | 4.9 | 4.3 | 4.3 | 5.5 | 5.3 | 3.5 | 3.7 |
| PSA610 | 8.9 | 9.8 | 5.0 | 8.4 | 4.5 | 4.3 | 3.0 | 4.0 |
| PSA6573A | 0.2 | 0.6 | 0.1 | 0.1 | 4.7 | 3.0 | 0.7 | 0.2 |
| PSA6574 | 6.0 | 6.2 | 4.4 | 4.5 | 4.6 | 4.4 | 3.3 | 2.5 |
| PSA910 | 4.4 | 5.1 | 4.1 | 4.9 | 4.4 | 4.6 | 2.8 | 3.2 |
| PSA915 | 5.6 | 6.1 | 4.8 | 5.9 | 5.4 | 5.2 | 3.3 | 3.7 |
| PSA950 | 5.5 | 6.4 | 5.1 | 5.8 | 4.3 | 4.3 | 3.0 | 3.0 |
| SCA1000 | 3.3 | 4.2 | 2.5 | 3.0 | 2.8 | 3.3 | 2.2 | 2.3 |
| DC-2013 | 1.0 | 1.3 | 0.7 | 1.1 | 1.1 | 1.4 | 1.3 | 1.3 |
| Q2-7406 | 4.8 | 5.3 | 3.0 | 4.7 | 3.6 | 3.6 | 2.7 | 2.8 |
| Q2-7735 | 4.7 | 5.0 | 3.0 | 4.1 | 4.0 | 3.9 | 2.1 | 2.4 |
| DC-7658 | 1.3 | 2.1 | 0.5 | 1.6 | 4.0 | 6.4 | 2.9 | 4.0 |
| DC-280A | 4.4 | 5.0 | 3.3 | 3.9 | 3.8 | 3.8 | 2.6 | 2.5 |
| DC-282 | 5.2 | 5.3 | 3.5 | 4.3 | 3.4 | 3.8 | 2.3 | 2.5 |
| DC-7355 | 4.9 | 5.2 | 3.3 | 4.5 | 3.5 | 3.7 | 2.3 | 3.0 |
| DC-7358 | 5.3 | 5.6 | 3.0 | 4.3 | 4.0 | 4.3 | 2.8 | 3.0 |
| Q2-7566 | 5.9 | 6.4 | 3.3 | 5.0 | 3.7 | 3.7 | 2.0 | 2.2 |

TABLE 4b

Shear adhesion of uncrosslinked and E-beam crosslinked silicone adhesives.

| Sample | 70° C. Shear (minutes) uncrosslinked | | 70° C. Shear (minutes) E-beam @ 6 Mrad | |
|---|---|---|---|---|
| | Painted panel | PP Panel | Painted panel | PP Panel |
| PSA518 | 3 | 4 | 10,000+ | 62 |
| PSA529 | 18 | 21 | 7436 | 1374 |
| PSA590 | 7 | 10 | 10,000+ | 898 |
| PSA595 | 8 | 11 | 10,000+ | 899 |
| PSA610 | 6 | 9 | 10,000+ | 10,000+ |
| PSA6573A | 146 | 111 | 10,000+ | 10,000+ |
| PSA6574 | 5 | 8 | 6879 | 138 |
| PSA910 | 3 | 7 | 10,000+ | 723 |
| PSA915 | 5 | 7 | 7700 | 608 |
| PSA950 | 1 | 2 | 211 | 51 |
| SCA1000 | 3 | 8 | 329 | 355 |
| DC-2013 | 1 | 2 | 2 | 5 |
| Q2-7406 | 25 | 25 | 10,000+ | 7243 |
| Q2-7735 | 62 | 74 | 10,000+ | 10,000+ |
| DC-7658 | 14 | 15 | 10,000+ | 198 |
| DC-280A | 13 | 13 | 10,000+ | 10,000+ |
| DC-282 | 41 | 15 | 10,000+ | 10,000+ |
| DC-7355 | 21 | 22 | 10,000+ | 10,000+ |
| DC-7358 | 7 | 7 | 6876 | 732 |
| Q2-7566 | 12 | 10 | 10,000+ | 10,000+ |

These same materials were then used to form foam core tapes. The silicone materials were first knife-unto a fluorosilicone liner and dried at 70° C. for 15 minutes to achieve 50 micron (2 mil) dry thickness. The dried silicone PSAs were then coated with ADHESION PROMOTER 4298UV (a liquid primer containing cyclohexane, xylene, ethyl alcohol, eythylbenzene, ethyl acetate, acrylic polymer, chlorinated polyolefins, and isopropyl alcohol; available from 3M Company, St. Paul, Minn.) and laminated to ACRYLIC FOAM TAPE 5344 (a tape having a medium density acrylic foam core and an acrylic adhesive on each side of the foam core; available from 3M). While supported by the fluorosilicone liner, these laminates were E-beam irradiated at an acceleration voltage of 300 key and doses of 6 and 10 Mrads. The E-beam units were broadband curtain type electron beam processors (PCT Engineered Systems, LLC, Davenport, Iowa). The E-beam crosslinked samples were further tested according to the Peel Test and Shear Test. The results are summarized in Tables 5a and 5b. No cohesive failure was observed.

TABLE 5a

Peel force for foam core tapes with E-beam cured silicone adhesive skins.

| | Peel (N/cm) E-beam @ 6 Mrad | | | | Peel (N/cm) E-beam @ 10 Mrad | | | |
|---|---|---|---|---|---|---|---|---|
| | Painted panel | | PP Panel | | Painted panel | | PP Panel | |
| Sample | 20 min | 72 hour | 20 min | 72 hour | 20 min | 72 hour | 20 min | 72 hour |
| PSA518 | 20.7 | 20.2 | 14.8 | 16.7 | 19.4 | 12.2 | 11.1 | 6.8 |
| PSA529 | 42.2 | 33.9 | 17.9 | 24.5 | 39.7 | 32.8 | 17.7 | 12.9 |
| PSA590 | 23.3 | 22.1 | 12.8 | 14.6 | 22.8 | 24.5 | 11.9 | 11.4 |
| PSA595 | 15.8 | 23.1 | 14.8 | 17.6 | 20.0 | 27.0 | 9.8 | 13.5 |
| PSA610 | 27.1 | 22.3 | 16.8 | 13.1 | 32.9 | 34.2 | 14.9 | 23.6 |
| PSA6573A | 36.2 | 37.1 | 3.7 | 12.6 | 36.0 | 36.6 | 6.4 | 21.2 |
| PSA6574 | 16.8 | 21.5 | 16.4 | 15.5 | 42.9 | 27.4 | 18.5 | 16.8 |
| PSA910 | 15.6 | 17.4 | 13.5 | 9.7 | 19.5 | 21.4 | 10.9 | 15.8 |
| PSA915 | 19.4 | 20.8 | 18.2 | 16.0 | 21.6 | 18.1 | 17.1 | 9.8 |
| PSA950 | 10.4 | 17.2 | 11.1 | 6.4 | 20.9 | 15.1 | 13.0 | 7.0 |
| SCA1000 | 11.7 | 17.9 | 11.7 | 13.4 | 17.0 | 25.8 | 12.4 | 16.1 |
| DC-2013 | 24.0 | 17.0 | 11.1 | 8.0 | 23.4 | 16.0 | 11.1 | 6.9 |
| Q2-7406 | 15.6 | 25.6 | 11.5 | 11.1 | 27.8 | 23.9 | 10.0 | 16.8 |
| Q2-7735 | 31.1 | 31.1 | 15.7 | 19.0 | 14.9 | 27.6 | 10.7 | 15.3 |
| DC-7658 | 39.4 | 33.8 | 19.5 | 16.1 | 36.4 | 37.1 | 16.7 | 18.1 |
| DC-280A | 25.9 | 12.0 | 15.5 | 7.9 | 21.9 | 23.5 | 13.0 | 9.6 |
| DC-282 | 27.6 | 22.6 | 14.8 | 8.0 | 23.5 | 26.4 | 13.9 | 13.2 |
| DC-7355 | 20.0 | 22.3 | 12.5 | 9.9 | 21.4 | 15.6 | 12.8 | 10.3 |
| DC-7358 | 16.5 | 19.0 | 9.8 | 8.6 | 15.5 | 16.2 | 10.5 | 6.8 |
| Q2-7566 | 7.5 | 11.2 | 10.4 | 5.9 | 14.0 | 11.3 | 3.6 | 9.7 |

TABLE 5b

Shear force for foam core tapes with E-beam cured silicone adhesive skins.

| | 70° C. Shear (min) E-beam @ 6 Mrad | | 70° C. Shear (min) E-beam @ 10 Mrad | |
|---|---|---|---|---|
| Sample | Painted panel | PP Panel | Painted panel | PP Panel |
| PSA518 | 1972 | 73 | 1581 | 35 |
| PSA529 | 652 | 524 | 725 | 748 |
| PSA590 | 358 | 200 | 183 | 107 |
| PSA595 | 4352 | 365 | 3563 | 391 |
| PSA610 | 1276 | 232 | 274 | 52 |
| PSA6573A | 10000+ | 2998 | 10000+ | 3914 |
| PSA6574 | 433 | 144 | 558 | 60 |
| PSA910 | 2240 | 98 | 1441 | 103 |
| PSA915 | 308 | 85 | 771 | 173 |
| PSA950 | 357 | 47 | 534 | 78 |
| SCA1000 | 1360 | 576 | 10000+ | 12 |
| DC-2013 | 10000+ | 740 | 10000+ | 161 |
| Q2-7406 | 2849 | 328 | 10000+ | 107 |
| Q2-7735 | 336 | 153 | 390 | 182 |
| DC-7658 | 596 | 166 | 10000+ | 642 |
| DC-280A | 1288 | 490 | 1156 | 362 |
| DC-282 | 368 | 953 | 398 | 168 |
| DC-7355 | 3089 | 219 | 1309 | 189 |
| DC-7358 | 455 | 28 | 1251 | 192 |
| Q2-7566 | 599 | 49 | 7183 | 21 |

Hot-Melt Coated Samples.

Example HM-1

One kilogram of PSA590 (used as received from Momentive Performance Materials) was dried in an aluminum tray at 66° C. (150° F.) for a week. The dried adhesive was fed into twin screw extruder (available from Berstorff) and coated with a rotary rod die coater onto fluorosilicone coated PET liner (2 CL PET 5100/5100 from Loparex) at 50 microns (2 mils) dry thickness. The coated samples were further E-beam irradiated at 300 key and 6 Mrads.

Example HM-1F

A foam core tape was prepared by laminating the cured adhesive of Example HM-1 to a surface of 5666 foam tape (from 3M Company) that had been primed with ADHESION PROMOTER 4298UV (from 3M Company).

Examples HM-2 through HM-7 were prepared by mixing EL POLYMER NA (from Wacker) and TMS-803 (from Wacker) in a Brabender at 120° C. (250° F.) for 60 minutes. The mixture was hot pressed between primed PET film and fluorosilicone coated PET liner (2 CL PET 5100/5100 from Loparex) into 50 micron (2 mil) thick uncured adhesive layer. The adhesive layer was then irradiated by E-beam (300 key and 6 Mrads).

Examples HM-2F through HM-7F were prepared laminating the uncured adhesive layers of Examples HM-2 through HM-7 to a surface of 5666 foam tape (from 3M Company) that had been primed with ADHESION PROMOTER 4298UV (from 3M Company). The resulting structure was then exposed to E-beam irradiation (300 key and 6 Mrads).

TABLE 6

Compositions of HM-2 through HM-7.

| Example | EL Polymer NA (g) | TMS-803 (g) |
| --- | --- | --- |
| HM-2 | 19 | 31 |
| HM-3 | 20 | 30 |
| HM-4 | 21 | 29 |
| HM-5 | 23 | 27 |
| HM-6 | 24 | 26 |
| HM-7 | 25 | 25 |

The hot-melt coated samples were tested for peel and shear. The results are summarized in Table 7.

TABLE 7

Peel and shear performance of Examples HM-1 to HM-7 and HM-1F to HM-7F.

| Ex. | E-Beam (Mrad) | Peel (N/cm) on MAC | Peel (N/cm) on TPO | Shear (minutes) on MAC | Shear (minutes) on TPO |
| --- | --- | --- | --- | --- | --- |
| HM-1 | 6 | 7.1 | 4.4 | 4585 | 431 |
| HM-1F | 6 | 20.1 | 11.3 | 643 | 76 |
| HM-2 | 6 | 11.3 | 8.3 | 6490 | 393 |
| | 9 | 9.4 | 9.1 | 10000 | 316 |
| | 12 | 8.6 | 8.3 | 10000 | 385 |
| | 15 | 8.4 | 8.1 | 10000 | 1549 |
| HM-2F | 6 | 34.4 | 26.2 | 1851 | 810 |
| | 9 | 34.0 | 26.6 | 1398 | 500 |
| | 12 | 28.7 | 23.5 | 10000 | 938 |
| | 15 | 31.2 | 23.2 | 8049 | 1342 |
| HM-3 | 6 | 8.4 | 8.1 | 2135 | 812 |
| | 9 | 8.2 | 7.8 | 10000 | 424 |
| | 12 | 7.4 | 7.4 | 10000 | 956 |
| | 15 | 7.2 | 7.0 | 10000 | 294 |
| HM-3F | 6 | 29.9 | 28.4 | 551 | 431 |
| | 9 | 31.6 | 25.8 | 7459 | 848 |
| | 12 | 28.1 | 24.8 | 10000 | 561 |
| | 15 | 31.5 | 24.1 | 7666 | 435 |
| HM-4 | 6 | 7.0 | 6.9 | 10000 | 278 |
| | 9 | 6.8 | 7.1 | 10000 | 575 |
| | 12 | 6.7 | 6.4 | 10000 | 1278 |
| | 15 | 6.3 | 6.1 | 10000 | 879 |
| HM-4F | 6 | 25.1 | 21.0 | 1181 | 292 |
| | 9 | 32.8 | 23.6 | 2925 | 1261 |
| | 12 | 22.9 | 20.3 | 10000 | 284 |
| | 15 | 26.6 | 23.2 | 10000 | 175 |
| HM-5 | 6 | 4.7 | 4.5 | 10000 | 416 |
| | 9 | 4.3 | 4.4 | 10000 | 2891 |
| | 12 | 4.1 | 3.7 | 10000 | 5966 |
| | 15 | 3.7 | 3.4 | 10000 | 10000 |
| HM-5F | 6 | 14.9 | 10.1 | 577 | 97 |
| | 9 | 14.0 | 11.5 | 939 | 42 |
| | 12 | 15.1 | 10.5 | 874 | 57 |
| | 15 | 16.5 | 11.1 | 1398 | 26 |
| HM-6 | 6 | 5.5 | 5.0 | 10000 | 386 |
| | 9 | 4.8 | 4.6 | 10000 | 977 |
| | 12 | 4.5 | 4.2 | 10000 | 10000 |
| | 15 | 4.2 | 3.7 | 10000 | 3913 |
| HM-6F | 6 | 14.9 | 11.3 | 661 | 148 |
| | 9 | 18.3 | 13.4 | 1050 | 141 |
| | 12 | 16.9 | 11.8 | 34 | 2 |
| | 15 | 16.8 | 11.7 | 38 | 26 |
| HM-7 | 6 | 4.6 | 4.3 | 10000 | 475 |
| | 9 | 4.0 | 3.9 | 10000 | 906 |
| | 12 | 3.4 | 3.3 | 10000 | 4349 |
| | 15 | 3.1 | 3.0 | 10000 | 5593 |
| HM-7F | 6 | 12.6 | 11.0 | 435 | 195 |
| | 9 | 15.4 | 11.1 | 343 | 63 |
| | 12 | 13.7 | 9.9 | 580 | 12 |
| | 15 | 11.9 | 10.0 | 1518 | 10 |

Example HM-8

3800 g of EL polymer NA (from Wacker) and 6200 g of TMS-803 (from Wacker) were fed into twin screw extruder (available from Berstorff) at 260° C. (500° F.) and coated with a rotary rod die coater at 50 microns (2 mil) dry thickness gap onto EX4011 foam tape (from 3M Company). The adhesive coated side of the foam tapes were covered with a fluorosilicone coated PET liner (2 CL PET 5100/5100 from Loparex) and E-beam irradiated at 300 key and 6 or 12 Mrads.

Example HM-9

Example HM-9 was prepared according to the procedure of Example HM-8 except that 3400 g of EL polymer NA and 6600 g of TMS-803 were used.

Examples HM-8 and HM-9 were tested for peel adhesion on two substrates. Peels were measured after a 20 minute dwell and after a 48 hour dwell.

TABLE 8

Peel results for Examples HM-8 and HM-9.

| Ex. | E-beam (Mrad) | Peel on MAC 20 min. | Peel on MAC 48 hr. | Peel on TPO 20 min. | Peel on TPO 48 hr. |
| --- | --- | --- | --- | --- | --- |
| HM-8 | 6 | 39.6 | 48.6 | 21.4 | 37.0 |
| | 12 | 26.7 | 39.0 | 19.8 | 25.4 |
| HM-9 | 6 | 42.2 | 44.8 | 13.9 | 19.9 |
| | 12 | 29.4 | 44.2 | 9.1 | 24.7 |

Foam Examples

The materials used to prepare electron beam cured silicone foams are summarized in Table 9.

TABLE 9

Materials used in Examples F-1 through F-19.

| Material | Description | Source |
| --- | --- | --- |
| EL-P-A | EL POLYMER NA | Wacker Chemie, AG |
| TMS-803 | MQ tackifier | Wacker Chemie, AG |

TABLE 9-continued

Materials used in Examples F-1 through F-19.

| Material | Description | Source |
|---|---|---|
| OHX-4040 | silanol terminated PDMS (XIAMETER OHX-4040) | Dow Corning |
| K-15 | Glass bubbles | 3M Company |
| K-37 | Glass bubbles | 3M Company |
| F100 | expandable microspheres (MICROPEARL F100) | Henkel |
| R972V | silica particles (AEROSIL R972V) | Cabot |

Example F-1 was prepared by mixing 20 g of EL POLYMER NA, 3 g of TMS803, and 2 g of F100 expandable microsphere in a Brabender at 93° C. (200° F.) and 16 RPM. The mixture was then expanded with a hot presser (Carver Laboratory Press) at 204° C. (400° F.). The resulting 1.65 mm (65 mil) thick foam sheet was milky white and self tacky. This foam sheet was then e-beamed at 300 key and 6 Mrads from both sides. The cured, self tacky silicone foam thus made had a density of 9.75 g/in3.

Foam Examples F-2 through F-19 were prepared according to the formulations provided in Tables 10A and 10B. The components were mixed at 2350 RPM for 5 minutes with a speedmixer (DAC 600 FVZ). The mixture was then pressed with a hot presser (Carver Laboratory Press) at 204° C. (400° F.). The resulting 1.5 mm (60 mil) thick foam sheet was milky white. These foam sheets were then e-beamed at 300 key and 15 Mrads from both sides. The resulting foam densities for samples using glass bubbles are summarized in Table 10A.

TABLE 10A

Foam compositions and densities for Examples F-2 through F-14 (foam produced by the addition of glass bubbles).

| | Composition (g) | | | | | Density |
|---|---|---|---|---|---|---|
| Ex. | EL-P-NA | OHX-4040 | K-15 | K-37 | R972V | (g/cc) |
| F-2 | — | 60 | — | 18 | — | 0.67 |
| F-3 | — | 40 | — | 24 | — | 0.56 |
| F-4 | — | 40 | 6 | — | — | 0.61 |
| F-5 | — | 40 | 12 | — | — | 0.64 |
| F-6 | — | 40 | 6 | — | 1.67 | 0.63 |
| F-7 | — | 40 | 6 | — | 3.33 | 0.66 |
| F-8 | — | 40 | 6 | — | 6.67 | 0.79 |
| F-9 | 40 | — | 3 | — | — | 0.83 |
| F-10 | 40 | — | 6 | — | — | 0.82 |
| F-11 | 40 | — | 12 | — | — | 0.86 |
| F-12 | 40 | — | 6 | — | 1.67 | 0.87 |
| F-13 | 40 | — | 6 | — | 3.33 | 0.89 |
| F-14 | 40 | — | 6 | — | 6.67 | 0.91 |

The resulting foam densities for samples using expandable polymeric microspheres are summarized in Table 9B.

TABLE 10B

Foam compositions and densities for Examples F-15 through F-19 (foam produced with expandable polymeric microspheres).

| | Composition (g) | | | Density |
|---|---|---|---|---|
| Ex. | EL-P-NA | F-100 | R972V | (g/cc) |
| F-15 | 40 | 6 | — | 0.40 |
| F-16 | 30 | 9 | — | 0.18 |
| F-17 | 30 | 9 | 1.25 | 0.18 |
| F-18 | 30 | 9 | 2.50 | 0.17 |
| F-19 | 30 | 9 | 5.00 | 0.21 |

Figure 2:
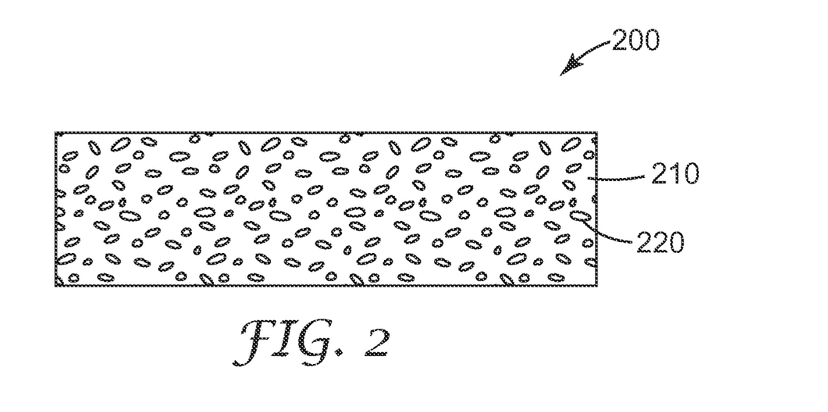
FIG. 2 illustrates an exemplary crosslinked polysiloxane foam according to some embodiments of the present disclosure.

Exemplary crosslinked polysiloxane foam 200 is illustrated in FIG. 2. Foam 200 comprises crosslinked polysiloxane material 210 with polymeric microspheres 220 dispersed throughout. Although not shown, glass bubbles could be included along with or in place of the polymeric microspheres.

In some embodiments, the materials and methods of the present disclosure may be used to produce non-pressure sensitive materials from non-functionalized silicone materials. Such materials having a, E-beam crosslinked polysiloxane network include films and coatings, including non-tacky silicone films.

Non-Tacky Film Examples

Example NTF-1 was prepared by mixing 40 g of EL POLYMER NA and 4 g of CAB-O-SIL TS-720 fumed silica (from Cabot) in a Brabender at 200° C. and 60 RPM for about 20 minutes. The mixture was then pressed between two fluorosilicone liners (from Loparex as 2 CL PET 5100/5100) by a hot presser (Carver Laboratory Press). The polysiloxane composition was electron beam at 300 key and 10 Mrads. The resulting 0.165 mm (6.5 mil) thick silicone films were transparent, tack-free, and elastic.

Example NTF-2 was prepared by mixing 40 g of DMS-53 (from Gelest) and 10 g of CAB-O-SIL TS-720 fumed silica TS-720 in a Brabender at 100° C. and 60 RPM for about 30 minutes. The mixture was then pressed between two fluorosilicone liners (from Loparex as 2 CL PET 5100/5100) by a hot presser (Carver Laboratory Press). The polysiloxane composition was electron beam at 300 key and 10 Mrads. The resulting 0.05 mm (2 mil) thick silicone films were transparent, tack-free, and elastic.

Various modifications and alterations of this invention will become apparent to those skilled in the art without departing from the scope and spirit of this invention.

What is claimed is:

1. A method of making a crosslinked silicone-based pressure sensitive adhesive, the method comprising:
    mixing by extruding a solventless composition comprising a nonfunctionalized silicone polymer and optional components selected from silicate tackifying resins, dyes, pigments, fillers, flame retardants, rheology modifiers, flow agents, surfactants, glass bubbles, and polymeric microspheres;
    wherein the nonfunctionalized silicone polymer has the following formula:

(1)

wherein:
    R1, R2, R3, and R4 are independently selected from the group consisting of an alkyl group and an aryl group;
    R5 is an alkyl group;
    n and m are integers, and at least one of m or n is not zero;
    optionally wherein one or more alkyl or aryl groups include a halogen substituent;
    subsequently, coating the composition on a substrate; and subjecting the coated composition to electron beam irradiation forming the crosslinked silicone-based pressure sensitive adhesive;

wherein the composition is substantially free of catalysts and initiators.

2. The method of claim 1, wherein the composition comprises a silicate tackifying resin.

3. The method according claim 1, wherein the nonfunctionalized silicone polymer is a poly(dialkyl siloxane).

4. The method according to claim 3, wherein the poly(dialkyl siloxane) is a poly(dimethyl siloxane).

5. The method according to claim 1, wherein the nonfunctionalized silicone polymer is an aromatic siloxane.

6. The method according to claim 1, wherein the nonfunctionalized silicone polymer comprises a gum having a dynamic viscosity at 25° C. of greater than 1,000,000 mPa·sec.

7. The method according to claim 2, wherein the silicate tackifying resin comprises an MQ resin tackifier.

8. The method according to claim 1, wherein the composition comprises at least one of glass bubbles and polymeric microspheres.

9. The method according to claim 1, wherein the nonfunctionalized silicone polymer comprises a silicone fluid having a dynamic viscosity at 25° C. of no greater than 600,000 mPa·sec.

10. The method according to claim 2, wherein the silicate tackifying resin comprises an MQ resin tackifier, an MQD resin tackifier, an MQT resin tackifier, or a combination thereof.

11. The method according to claim 1, wherein one or more of the alkyl or aryl groups includes a halogen substituent.

12. The method according to claim 11, wherein one or more alkyl groups is —$CH_2CH_2C_4F_9$.

13. The method according to claim 1, wherein each R5 is a methyl group.

14. The method according to claim 1, wherein R1 and R2 are alkyl groups and n is zero.

15. The method according to claim 14, wherein the alkyl groups are methyl groups.

16. The method according to claim 1, wherein R1 is an alkyl group, R2 is an aryl group, and n is zero.

17. The method according to claim 16, wherein R1 is a methyl group and R2 is a phenyl group.

18. The method according to claim 1, wherein R1 and R2 are alkyl groups and R3 and R4 are aryl groups.

19. The method according to claim 18, wherein R1 and R2 are methyl groups and R3 and R4 are phenyl groups.

20. The method according to claim 1, further comprising removing the substrate from the pressure sensitive adhesive.

21. The method according to claim 1, wherein the substrate is a support layer comprising at least one of a paper, a polymeric film, and a metal.

* * * * *